(12) United States Patent
Haase et al.

(10) Patent No.: US 7,281,538 B2
(45) Date of Patent: Oct. 16, 2007

(54) COUPLING FOR A ROTARY DRIVE

(75) Inventors: Thorsten Haase, Lübeck (DE); Jens Römer, Lübeck (DE); Ahmet Türker, Lübeck (DE)

(73) Assignee: Dräger Medical AG & Co. KGaA (DE)

( * ) Notice: Subject to any disclaimer, the term of this patent is extended or adjusted under 35 U.S.C. 154(b) by 1227 days.

(21) Appl. No.: 10/247,087

(22) Filed: Sep. 19, 2002

(65) Prior Publication Data

US 2003/0113203 A1 Jun. 19, 2003

(30) Foreign Application Priority Data

Dec. 15, 2001 (DE) .................................. 101 61 821

(51) Int. Cl.
  *A61M 11/00* (2006.01)
  *B05B 1/26* (2006.01)
  *F16D 11/00* (2006.01)
  *F16D 13/60* (2006.01)

(52) U.S. Cl. ............................. 128/200.18; 192/107 R

(58) Field of Classification Search .................. 464/30, 464/182; 192/107 R, 107 M; 128/204.18
  See application file for complete search history.

(56) References Cited

U.S. PATENT DOCUMENTS

| 3,434,577 A | * | 3/1969 | Mathison | ..................... 192/46 |
| 3,617,426 A | * | 11/1971 | Grundman | ................. 428/66.2 |
| 3,718,009 A | * | 2/1973 | Perina | ......................... 464/30 |
| 6,213,119 B1 | * | 4/2001 | Brydon et al. | ......... 128/204.23 |

FOREIGN PATENT DOCUMENTS

DE  1 055 744  4/1959

\* cited by examiner

*Primary Examiner*—Justine R. Yu
*Assistant Examiner*—Kristen Matter
(74) *Attorney, Agent, or Firm*—McGlew & Tuttle, P.C.

(57) ABSTRACT

A detachable coupling on a rotary drive is provided with first and second coupling surfaces (14, 17) arranged opposite each other. The coupling parts can be assembled without observing a preferential position. The first coupling surface (14) has a plurality of needles (15), which are arranged in a matrix-like pattern and point away from the coupling surface (14). The second coupling surface (17) has a fabric layer (18) designed to receive the needles (15).

20 Claims, 2 Drawing Sheets

A - A

COUPLING FOR A ROTARY DRIVE

FIELD OF THE INVENTION

The present invention pertains to a coupling for a rotary drive, particularly of a compressor or air supply unit with first and second coupling surfaces arranged opposite each other.

BACKGROUND OF THE INVENTION

A coupling, which is located between the drive motor and the impeller of a radial compressor, has been known from DE-AS 1 055 744. The coupling is designed as a jaw clutch that is plugged in axially and engages the drive shaft of the drive motor. To remove the coupling, the jaw clutch is pulled out of the counterpiece. The prior-art coupling is suitable for devices that must be removed for maintenance or cleaning purposes only occasionally. The drawback of the prior-art coupling is that a preferential position is to be observed to a certain extent for the mounting in order to make it possible for the teeth of the jaw clutch to engage the drive shaft. In addition, an angular offset between the jaw clutch and the drive shaft can be compensated to a very limited extent only.

SUMMARY OF THE INVENTION

The basic object of the present invention is to improve a coupling of the type mentioned such that the coupling parts can be assembled without observing a preferential position.

According to the invention, a coupling for a rotary drive is provided with first and second coupling surfaces arranged opposite each other. The first coupling surface has a plurality of needles arranged in a matrix-like or grid or distributed pattern and point away from the first coupling surface. The second coupling surface has a fabric layer that receives the needles to form a coupling.

The advantage of the present invention is essentially that needles, which are arranged in a distributed or grid or matrix-like pattern engage the fabric layer. As such, the coupling elements cooperate to couple respective rotating parts together, such as an impeller and a drive motor of a gas delivery unit. Since the needles can be inserted at any point of the fabric layer, the connection of the coupling elements is possible in any rotary angle position. A certain axial angular offset between the coupling elements can also be compensated due to the elasticity of the fabric layer.

The strength of the needles and the strength of the fabric layer are coordinated with one another such that the predetermined breaking point is located in the area of the fabric layer, so that this can also be replaced as an expendable part as needed. Soft, firm materials, preferably those made of synthetic fibers, which the needles can penetrate and which have a certain strength to transmit a torque between the coupling surfaces, are suitable for use as fabric layers. A needled felt is especially well suited for use as a fabric layer. A preferred thickness is in the range of 3 mm. Loop straps, as they are known from Velcro fasteners, may be advantageously used as well.

It is especially advantageous to use needles of a straight shape, i.e., noncurved needles, which taper forward into a point, because these can be introduced into the fabric layer without appreciable axial forces. As a result, no appreciable axial forces are generated, especially also during the separation of the coupling.

It is especially advantageous to use needles that have a conical cross-sectional contour. The largest cross-sectional area is located now at the foot of the needle in the area of the first coupling surface. The needles are thus especially resistant to bending and torsional stresses, which occur in a rotary drive in the area of the drive shaft.

It is useful to use needles with a length greater than or equal to 1 mm. The length of the needles is preferably in a range of 2 mm to 3 mm.

The value of the torque that can be transmitted depends on the number of needles per unit area. It is useful to select the number of needles per $cm^2$ to be such that there will be 30 to 40 pieces.

In a preferred embodiment the number of needles per $cm^2$ will be approximately 60 pieces, having a diameter of 0.5 mm at the foot of the needle and a diameter of 0.1 mm at the tip of the needle. The needles have a length of 3.5 mm.

It is especially advantageous to arrange the part of the coupling that is provided with the needles on the drive side of the rotary drive. It is thus not necessary to perform any maintenance work on the drive side during the disassembly of the rotary drive, because no wear occurs on the needles. The coupling part with the fabric layer, which is located on the other part of the coupling, is usually pulled off from the drive motor for cleaning or maintenance purposes, at which time the fabric layer can be checked and replaced if necessary. It is advantageous for this to provide the fabric layer with a self-adhesive film, so that it can be pulled off from the second coupling surface or can be fastened thereto in a simple manner. As an alternative to the self-adhesive film, it is also possible to use a contact adhesive.

It is especially advantageous to use the coupling described in the present application in a breathing gas delivery unit of a respirator. The part of the coupling at which the fabric layer is located is now connected to a radial compressor, which draws in breathing gas and delivers same into a breathing gas circuit. The radial compressor is pulled off from the drive as one assembly unit during the maintenance of the apparatus and is then cleaned. It is especially advantageous that no axial forces occur during the disassembly of the radial compressor, i.e., during the separation of the coupling, and that no preferential positions need to be observed in the opposite case, namely, during the connection of the radial compressor to the drive unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
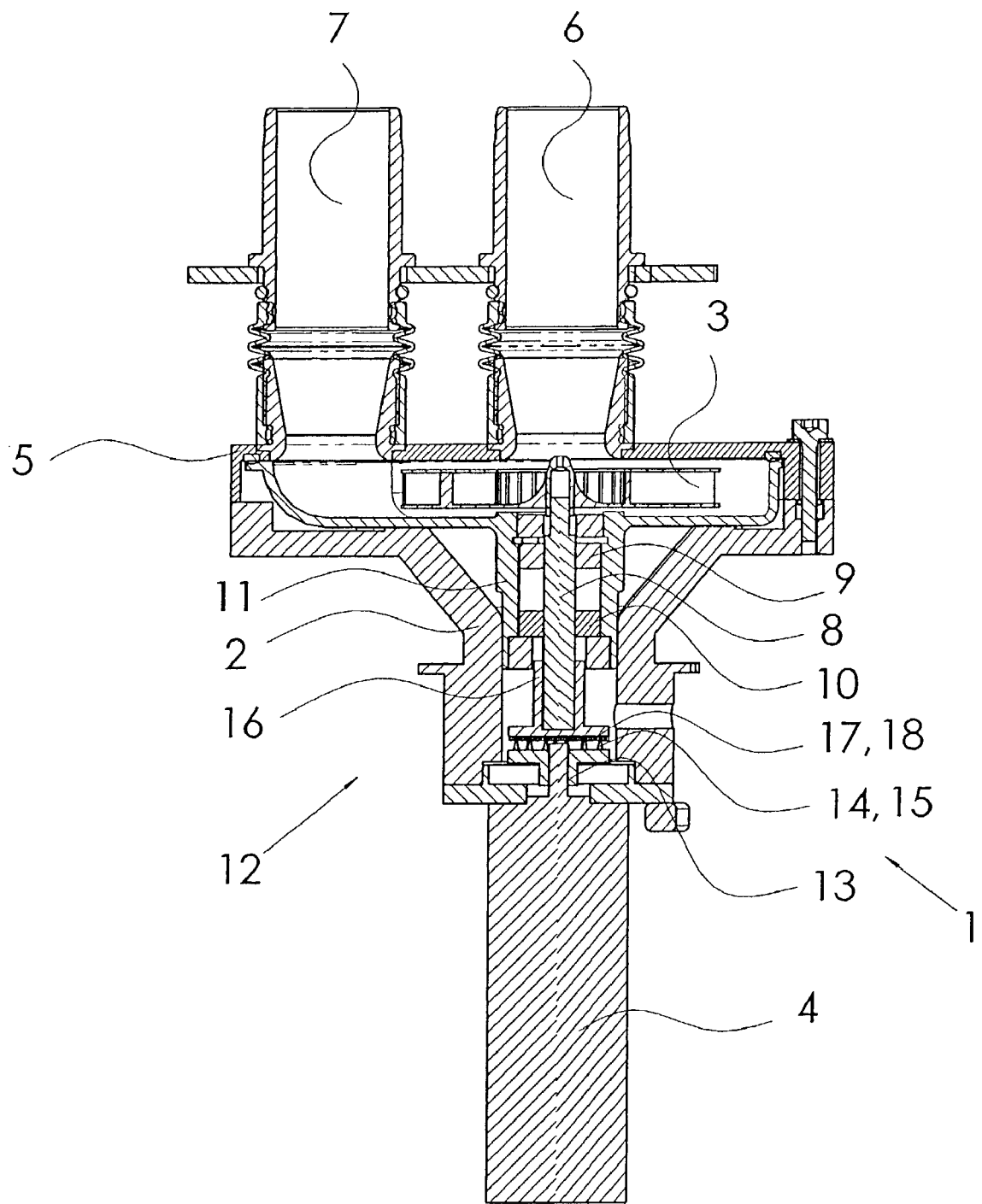
FIG. 1 is a longitudinal section through a radial compressor with a drive motor according to the invention.

Referring to the drawings in particular, FIG. 1 schematically shows a longitudinal section through a radial compressor 1, in which an impeller 3 arranged in a housing 2 is set into rotation by a drive motor 4. The radial compressor 1 is part of a breathing gas delivery unit of a respirator, which is not shown more specifically in FIG. 1. The top side of the housing 2 is closed with a cover 5, on which gas connections 6, 7 for drawing in and discharging gas are located. The impeller 3 is fastened to a shaft 8, which is fastened in a rotatingly movable manner in a compressor housing 11 by means of two radial bearings 9, 10. With the cover 5 removed, the impeller 3 and the compressor housing 11 are introduced together into the housing 2. A coupling 12, by means of which the connection between the impeller 3 and the drive motor 4 is established, is located on the underside of the shaft 8. The coupling 12 comprises a first coupling adapter 13 with a first coupling surface 14, on which matrix-like needles 15 are arranged with a density of 30 needles per cm$^2$, and a second coupling adapter 16, which is located on the shaft 8. The second coupling adapter 16 has a second coupling surface 17, which is arranged opposite the first coupling surface 14 and has a needled felt 18. The coupling surfaces 14, 17 are directed at right angles to the shaft 8. In the assembled state, the needles 15 engage the needled felt 18, so that the transmission of torque is possible between the drive motor 4 and the shaft 8.

Figure 2:
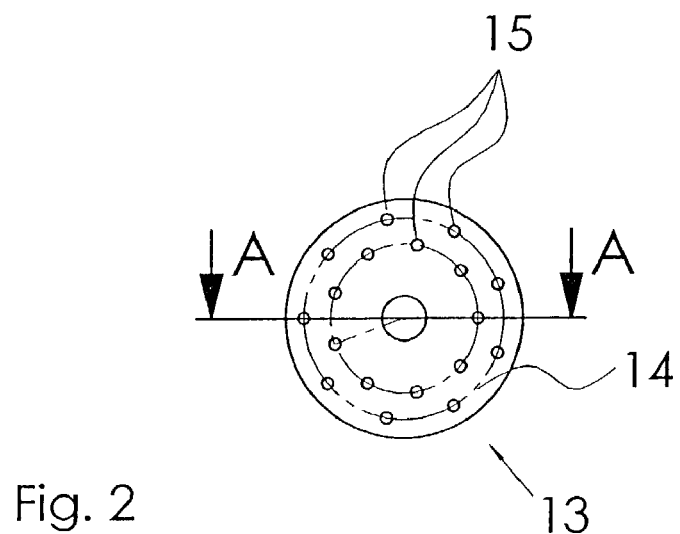
FIG. 2 is a top view of a coupling surface with needles arranged in a matrix-like pattern.

FIG. 2 illustrates a top view of the first coupling surface 14 with the needles 15.

Figure 3:
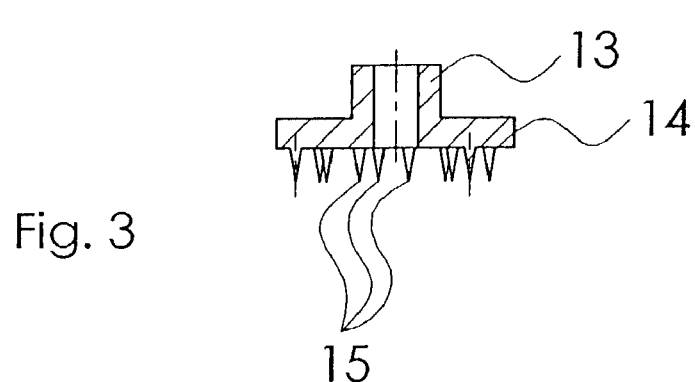
FIG. 3 is a longitudinal section of the coupling surface according to FIG. 2.

FIG. 3 shows the longitudinal section of the first coupling adapter 13 with the needles 15. The needles 15 stand vertically on the first coupling surface 14 and have a conical, upwardly tapering cross-sectional contour with a slope angle of about 10° in relation to a vertical axis. The needles 15 have a length of 2 mm and have a diameter of 1 mm at the foot of the needle and a diameter of 0.3 mm at the tip of the needle.

Figure 4:
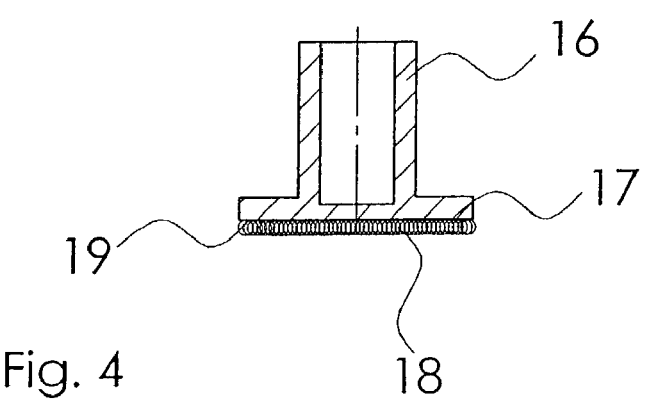
FIG. 4 is a longitudinal section of a coupling surface with a needled felt.

FIG. 4 shows the longitudinal section of a second coupling adapter 16. A needled felt 18 of a thickness of about 3 mm is fastened to the second coupling surface 17. On its underside, the needled felt 18 has a self-adhesive film 19, which is laid on the second coupling surface 17. The needled felt 18 can thus be simply pulled off from the second coupling surface 17 and replaced when needed.

While a specific embodiment of the invention has been shown and described in detail to illustrate the application of the principles of the invention, it will be understood that the invention may be embodied otherwise without departing from such principles.

What is claimed is:

1. A coupling for a rotary drive, comprising:
   a first coupling surface having a plurality of axially extending needles arranged in a distributed pattern, the needles pointing away from and perpendicular to said first coupling surface;
   a second coupling surface arranged opposite said first coupling surface, said second coupling surface having a fabric layer for receiving said needles, said first coupling surface being supported in a fixed axial position relative to a fixed axial position of said second coupling surface to maintain said needles engaged with said fabric layer to provide a positive torsional connection for one of said first coupling surface and said second coupling surface driving the other of said first coupling surface and said second coupling surface.

2. A coupling in accordance with claim 1, wherein said needles have a straight shape.

3. A coupling in accordance with claim 1, wherein said needles have a conical cross-sectional contour tapering to a point.

4. A coupling in accordance with claim 1, wherein a length of said needles is greater than or equal to 2 mm.

5. A coupling in accordance with claim 1, wherein a number of the needles is in a range of 30 to 40 pieces per cm2.

6. A coupling in accordance with claim 1, wherein said first coupling surface is connected to a drive motor.

7. A coupling in accordance with claim 1, wherein said fabric layer is fastened to said second coupling surface with a self-adhesive film.

8. A rotary drive with detachable coupling, comprising:
   a housing;
   a drive part with a first coupling surface, said drive part being mounted relative to said housing for rotation with said first coupling surface and with said first coupling surface extending radially relative to an axis of rotation, said first coupling surface having one of a plurality of needles arranged in a distributed pattern, the needles pointing away from and perpendicular to said first coupling surface, and a fabric layer for receiving the needles;
   a driven part with a second coupling surface, said driven part being mounted relative to said housing for rotation with said second coupling surface and with said second coupling surface extending radially relative to the axis of rotation, said second coupling surface having the other of the plurality of needles arranged in a distributed pattern, the needles pointing away from the first coupling surface and the fabric layer for receiving the needles, whereby the drive part and the driven part are connected with said needles extending into said fabric layer without any required rotational position of said drive part relative to said driven part, said driven part being mounted in a fixed axial position relative to said drive part;
   a drive motor connected to said first drive part, said drive motor being mounted relative to said housing in a position substantially axially fixed relative to said driven part;
   a rotatable gas delivery element mounted to said housing for rotation with said driven part, said rotatable gas delivery element being mounted in a position substantially axially fixed relative to said driven part.

9. A rotary drive with detachable coupling in accordance with claim 8, wherein said fabric layer is fastened to said second coupling surface with a self-adhesive film.

10. A rotary drive with detachable coupling in accordance with claim 8, wherein said needles extend axially and have a straight shape with respect to a central axis of each respective one of said needles.

11. A rotary drive with detachable coupling in accordance with claim 8, wherein said needles extend axially and have a conical cross-sectional contour tapering to a point along a central axis thereof.

12. A rotary drive with detachable coupling in accordance with claim 8, wherein a length of said needles is greater than or equal to 2 mm.

13. A rotary drive with detachable coupling in accordance with claim 8, wherein a number of the needles is in a range of 30 to 40 pieces per cm$^2$.

14. A rotary drive with detachable coupling in accordance with claim 8, wherein:
   each of said needles extends axially and is axially symmetrical relative to a central needle axis thereof; and
   said housing defines a mounting space for said rotatable gas delivery element, a mounting space for said drive part and a mounting space for said driven part, said motor being mounted at a fixed location relative to said housing to maintain an axially fixed distance between said motor and said rotatable gas delivery element.

15. A rotary drive with detachable coupling in accordance with claim 14, further comprising:
a compressor housing with said rotatable gas delivery element mounted thereto in said mounting space for said rotatable gas delivery element; and
a cover to seal a compression space in said compressor housing, whereby said gas delivery element may be removed from said housing for cleaning, maintenance or replacement including removing said cover, removing said compressor housing with said rotatable gas delivery element mounted thereto and disconnecting the first coupling surface and the axially fixed second coupling surface by axially moving said needles out of engagement with the fabric layer and removing the first coupling surface from the housing for cleaning, maintenance or replacement.

16. A process for providing a coupling, the process comprising the steps of:
providing a respirator housing;
mounting a drive element at a fixed axial position relative to said respirator housing;
mounting a rotatable gas delivery element of a respirator breathing gas delivery unit for rotation relative to said respirator housing and at a substantially fixed axial distance from said drive element;
providing a first coupling surface connected to the rotatable gas delivery element and mounted at a fixed axial position relative to said housing for rotation relative to said housing, the first coupling surface having one of a plurality of axially extending needles arranged in a distributed pattern, said needles pointing away and perpendicular to said first coupling surface and a fabric layer for receiving the needles;
providing a second coupling surface connected to said drive element and mounted at a fixed axial position and driven by said drive element for rotation of said second coupling surface relative to said housing, said second coupling surface having the other of the plurality of needles arranged in a distributed pattern, the needles pointing away from the first coupling surface and the fabric layer for receiving the needles;
providing a connection between said drive element and said rotatable gas delivery element via an axially fixed connection between the axially fixed first coupling surface and the axially fixed second coupling surface with the fabric layer receiving the needles;
maintaining the axially fixed connection between the axially fixed first coupling surface and the axially fixed second coupling surface with the fabric layer receiving the needles while operating the breathing gas delivery unit by rotation of said drive element for rotating said rotatable gas delivery element.

17. A process according to claim 16, wherein:
said drive element includes a motor mounted at a fixed location relative to said housing;
said housing defines a mounting space for said rotatable gas delivery element, a mounting space for said first coupling surface and a mounting space for said second coupling surface to maintain an axially fixed distance between said motor and said rotatable gas delivery element.

18. A process according to claim 17, further comprising:
providing a compressor housing with said rotatable gas delivery element mounted thereto in said mounting space for said rotatable gas delivery element; and
providing a cover to seal a compression space in said compressor housing.

19. A process according to claim 18, further comprising:
removing said gas delivery element from said respirator housing for cleaning, maintenance or replacement including removing said cover, removing said compressor housing with said rotatable gas delivery element mounted thereto and returning the gas delivery element to said respirator housing or mounting a new rotatable gas delivery element in said housing with said compressor housing and sealing said compression space in said compressor housing with said cover.

20. A process according to claim 19, further comprising:
disconnecting the first coupling surface and the axially fixed second coupling surface by axially moving said needles out of engagement with the fabric layer and removing the first coupling surface from the respirator housing for cleaning or replacement with said gas delivery element and said compressor housing and said cover removed.

* * * * *